United States Patent
Medles et al.

(10) Patent No.: US 8,934,458 B2
(45) Date of Patent: Jan. 13, 2015

(54) CANCELLING INTERFERENCE IN A WIRELESS CELLULAR NETWORK

(75) Inventors: Abdelkader Medles, Bristol (GB); Gang Wang, Bristol (GB)

(73) Assignee: Nvidia Technology UK Limited, London (GB)

( * ) Notice: Subject to any disclaimer, the term of this patent is extended or adjusted under 35 U.S.C. 154(b) by 224 days.

(21) Appl. No.: 13/498,238

(22) PCT Filed: Jul. 30, 2010

(86) PCT No.: PCT/EP2010/061102
§ 371 (c)(1),
(2), (4) Date: May 23, 2012

(87) PCT Pub. No.: WO2011/035961
PCT Pub. Date: Mar. 31, 2011

(65) Prior Publication Data
US 2012/0230301 A1 Sep. 13, 2012

(30) Foreign Application Priority Data
Sep. 25, 2009 (GB) .................................. 0916911.1

(51) Int. Cl.
*H04B 15/00* (2006.01)
*H04B 1/7107* (2011.01)
(52) U.S. Cl.
CPC .... *H04B 1/7107* (2013.01); *H04B 2201/70701* (2013.01)

USPC ............ 370/335; 370/336; 370/329; 375/346
(58) Field of Classification Search
CPC ..................... H04B 1/707; H04B 2201/70701; H04W 72/0446
USPC ............................ 370/335, 336, 329; 375/346
See application file for complete search history.

(56) References Cited

U.S. PATENT DOCUMENTS

| | | | |
|---|---|---|---|
| 2002/0131390 A1* | 9/2002 | Kuo et al. | 370/342 |
| 2005/0117679 A1* | 6/2005 | Paul et al. | 375/354 |

FOREIGN PATENT DOCUMENTS

| | | |
|---|---|---|
| EP | 1335500 A1 | 12/2003 |
| GB | 2416957 A | 2/2006 |
| GB | 0916911.1 | 9/2009 |
| WO | 0135564 A2 | 5/2001 |
| WO | 03043239 A1 | 5/2003 |
| WO | 2011035961 A1 | 3/2011 |

\* cited by examiner

*Primary Examiner* — Jamal Javaid

(57) ABSTRACT

A method, program and user equipment for wireless communication in a cellular communication system comprising a plurality of base stations. The method comprises: synchronizing to one of said the base stations using a synchronization channel transmitted from that base station; receiving a pilot channel from said base station; after synchronizing to said base station, receiving a signal from that base station; and using the pilot channel from said base station to cancel interference on said signal caused by the synchronization channel.

21 Claims, 6 Drawing Sheets

CANCELLING INTERFERENCE IN A WIRELESS CELLULAR NETWORK

CROSS-REFERENCE TO RELATED APPLICATION

This application is the National Stage of, and therefore claims the benefit of, International Application No. PCT/EP2010/061102 filed on Jul. 30, 2010, entitled "Cancelling Interference in a Wireless Cellular Network," which was published in English under International Publication Number WO 2011/035961 on Mar. 31, 2011, and has a priority date of Sep. 25, 2009, based on GB application No. 0916911.1. Both of the above applications are commonly assigned with this National Stage application and are incorporated herein by reference in their entirety.

FIELD OF THE INVENTION

The present invention relates to interference caused by synchronization channels in a wireless cellular communication system.

BACKGROUND

The use of the primary and secondary synchronization channels in the 3GPP WCDMA system allows the user equipment to achieve initial synchronization to the serving cell. Once past this step the synchronization channels are no longer needed, but their presence still generates interference to the other channels.

In the 3GPP wideband CDMA (WCDMA) system, Orthogonal Variable Spreading (OVSF) codes are used to allow multiplexing of different channels and multiple access for sharing of resources among users. Because of their orthogonality, the use of OVSF codes means no inter-code interference is created.

An exception to this however is the Primary and Secondary Synchronization Channels (PSCH and SSCH) which are not scrambled with the cell specific scrambling code (section 5.3.3.5, 3GPP TS 25.211, "Technical Specification Group Radio Access Network; Physical Channels and Mapping of Transport Channels onto Physical Channels (FDD)", December 2005). All the channels other than the synchronization channels are allocated OVSF codes and then scrambled. The scrambling sequence is a pseudo random sequence designed to randomize the inter-cell interference. Because the OVSF codes are scrambled with the same scrambling code they stay orthogonal. The synchronization channels on the other hand are not scrambled (and also allocated different codes) and hence are not orthogonal. This means the synchronization channels can cause interference with the rest of the channels.

SUMMARY

The share of power allocated to synchronization channels such as the PSCH and SSCH is typically low, and the assumption in the past has been that the effect of interference from these channels can therefore be considered negligible. However, in order to achieve the highest performance, especially in the case of the latest categories introduced in Release 7 for the support of 64-QAM constellation and the MIMO (Multiple-Input-Multiple-Output) mode for example, this interference may in fact be significant. That is, the presence of synchronization channels can generate interference to the other channels which leads to a harmful performance degradation, especially in the conditions required to achieve the highest data transfer rates. It would therefore in fact be desirable to take steps to deal with such interference from synchronization channels.

To address this, the present invention provides a synchronization channel cancellation method which takes advantage of the presence of an existing pilot channel in order to cancel interference from a synchronization channel.

According to one aspect of the present invention, there is provided a method of wireless communication in a cellular communication system comprising a plurality of base stations, the method comprising: synchronizing to one of the base stations using a synchronization channel transmitted from that base station; receiving a pilot channel from said base station; after synchronizing to said base station, receiving a signal from that base station; and using the pilot channel from said base station to cancel interference on said signal caused by the synchronization channel.

In embodiments, the communication system may be a code division multiple access communication system, each base station operating according to a different respective scrambling code different from that of a plurality of others of said base stations; the synchronization channel may not be scrambled by one of said scrambling codes and thus cause interference on said signal; and said cancellation may comprise using the pilot channel from said base station to cancel interference on said signal caused by non-orthogonality of the synchronization channel.

Said cancellation may comprise: performing a channel estimate based on the pilot channel; estimating a symbol received in the synchronization channel; using the estimated symbol and channel estimate to estimate a gain of the synchronization channel; and using the gain to cancel interference on said signal caused by the synchronization channel.

The estimation of said symbol may be by: despreading the synchronization channel, estimating a correlation between the despread synchronization channel and the pilot channel, estimating a power of the pilot channel, and estimating said symbol based on said correlation and pilot channel power.

Said symbol may be estimated using predetermined knowledge of a structure of the symbol.

At least one of said estimates of correlation and pilot channel power may be averaged over a plurality of slots.

The same estimate of said symbol may be used over a plurality of slots of the synchronization channel for which corresponding interference is cancelled on said signal.

The pilot channel may be a common pilot channel. The communication system may be a WCDMA system and the common pilot channel may be a CPICH.

Said synchronization may comprise synchronizing to said base station using a plurality of synchronization channels; and said cancellation may comprise using the pilot channel from said base station to cancel interference on said signal caused by the plurality of synchronization channels.

Said synchronization may comprise synchronizing to said base station using a primary and secondary synchronization channel; and said cancellation may comprise using the pilot channel from said base station to cancel interference on said signal caused by the primary and secondary synchronization channels.

The communication system may be a WCDMA system and said primary and secondary synchronization channels may be a PSCH and SSCH respectively.

According to another aspect of the present invention, there is provided a program product for wireless communication in a cellular communication system comprising a plurality of base stations, the program comprising code embodied on a computer-readable medium and being configured so as when executed on a user equipment to perform any of the above method features.

According to another aspect of the present invention, there is provided a user equipment for wireless communication in cellular communication system comprising a plurality of base stations, the user equipment comprising: a receiver arranged to receive a synchronisation channel and a pilot channel transmitted from one of said base stations; a processing unit, coupled to the receiver, arranged to synchronize to said base station using the synchronization channel; wherein the receiver is configured to receive a signal from said base station after synchronization to that base station; and wherein the processing unit is configured to use the pilot channel from said base station to cancel interference on said signal caused by the synchronization channel.

The processing unit may be further configured in accordance with any of the above method features.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

As mentioned, in the 3GPP WCDMA system OVSF codes are used to allow multiplexing of different channels and multiple access for sharing of resources among users. With the use of OVSF codes no inter-code interference is created, but an exception is the Primary and Secondary Synchronization Channels (PSCH and SSCH) which are not scrambled with the cell specific scrambling code and thus are not orthogonal to the rest of channels and cause interference. The share of power allocated to these channels is usually low. However, in order to achieve the highest performance, especially in the case of the latest categories introduced in Release 7 for the support of 64-QAM constellation and the MIMO (Multiple-Input-Multiple-Output) mode, this interference should be avoided and this can be done via cancellation of the Synchronization Channels from the received signal.

In preferred embodiments of the present invention, a new synchronization channel cancellation method is provided which takes advantage of the presence of the existing reference pilot channel (CPICH) to achieve near perfect cancellation. This may also be achieved with a reduction of complexity when compared to existing methods that do not use the CPICH channel.

The problem of interference from synchronization channels will now be described in more detail in relation to FIGS. 1 to 4 in the context of a WCDMA system. However, it will be appreciated that the problem of interference from synchronization channels can occur in any cellular system, and a similar solution of cancellation based on a pilot channel can be applied given the disclosure herein.

As will be familiar to a person skilled in the art, a code division multiple access (CDMA) system spreads different signals by different respective spreading codes in order to allow those signals to be transmitted on the same frequency at the same time through the same region. This spreading works by multiplying each bit of the signal by a respective spreading code, such that each information bit is represented by a larger number of binary chips. The desired signal can then be detected again from amongst the other signals given knowledge of its respective spreading code.

Figure 1:
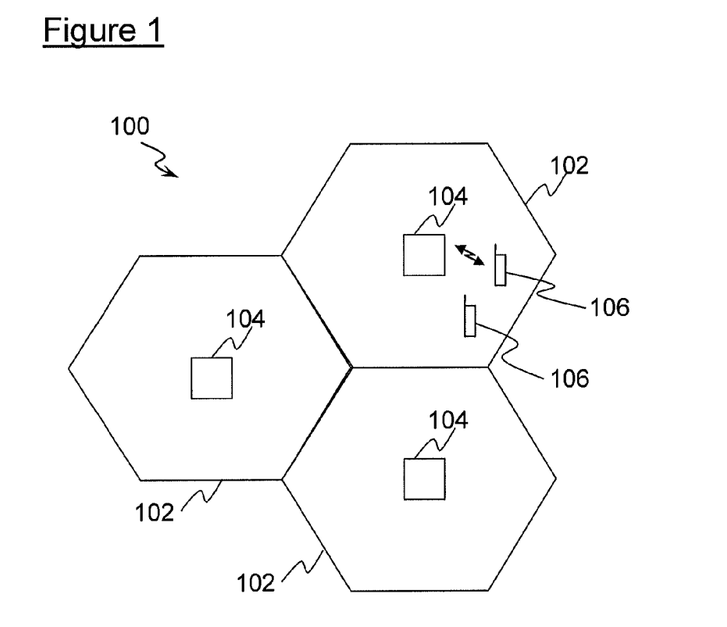
FIG. 1 is a schematic representation of a cellular communication system.

Referring to FIG. 1, in a cellular system using CDMA, each cell 102 is served by a respective base station 104 and each base station can transmit on a number of different dedicated channels to different respective user equipments (UEs) 106 by means of different respective OVSF spreading codes, referred to as channelization codes. Each base station may also transmit one or more pilot channels by means of one or more further respective channelization codes. The main purpose of a pilot channel is as a reference to allow the UE 106 to perform a channel estimation. Such pilot channels may be common pilot channels accessible by all UEs 106 in the cell 102 (as opposed to dedicated channels which are each intended for a specific respective recipient UE).

The OVSF channelization codes are chosen to be mutually orthogonal to one another within the same cell, which means channels transmitted from the same cell and spread by different OVSF codes do not interfere with one another.

Each base station also additionally scrambles each of its dedicated channels and the common pilot channel by another spreading code referred to as a scrambling code. Each base station uses its own different scrambling code, characteristic of the base station (at least within a certain region). A base station may be referred to as a "Node B" in WCDMA terminology, but the general term base station may also be used herein to cover WCDMA Node Bs or other types.

The scrambling codes between different base stations (cells) are not orthogonal, and there is no point in having them orthogonal for several reasons. Within the same base station, all the channels other than the synchronization channels are allocated OVSF codes and then scrambled. The scrambling sequence is a pseudo random sequence designed to randomized the inter-cell interference. Because the OVSF codes are scrambled with the same scrambling code they stay orthogonal.

However, the synchronization channel is not scrambled by the scrambling code. The synchronization channel is required for a UE 106 to initially search for and synchronize with a base station 104 before it can connect. Part of this is may be to allow the UE to obtain the cell's scrambling code, and so of course the synchronization channel itself cannot be spread by that scrambling code. This has the side effect that the synchronization channels are not orthogonal to the other channels, and therefore that the other channels are susceptible to interference from synchronization channel. As mentioned, because the OVSF codes are scrambled with the same scrambling they stay orthogonal; but the synchronization channels on the other hand are not scrambled (and also allocated different codes) and hence are not orthogonal.

Figure 2:
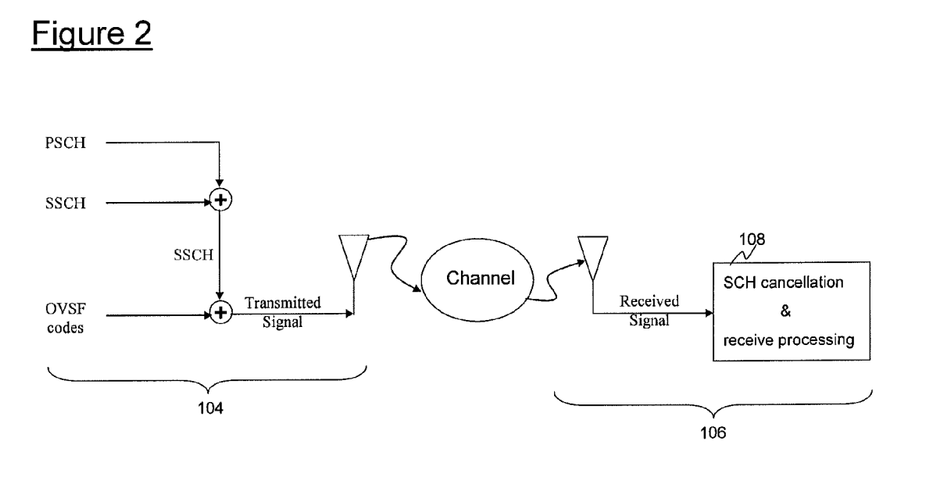
FIG. 2 is a schematic block diagram of a transmit-receive chain including synchronization channels.
Figure 3:
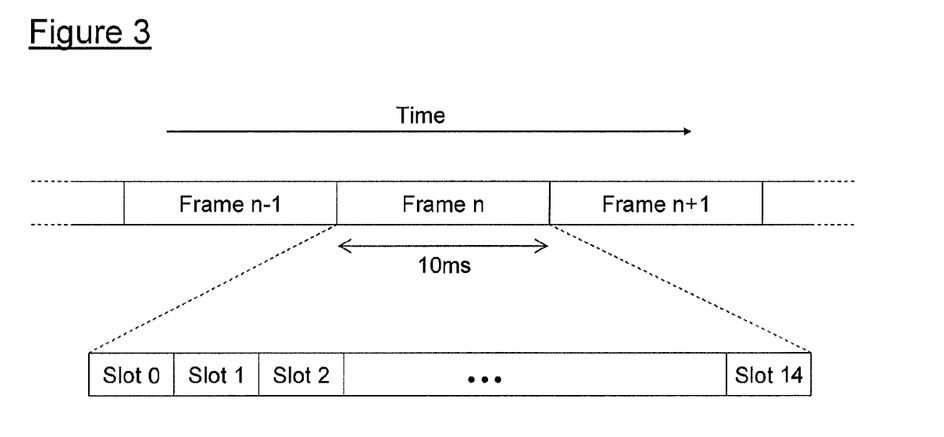
FIG. 3 is a schematic representation of the frame structure of a channel.
Figure 4:
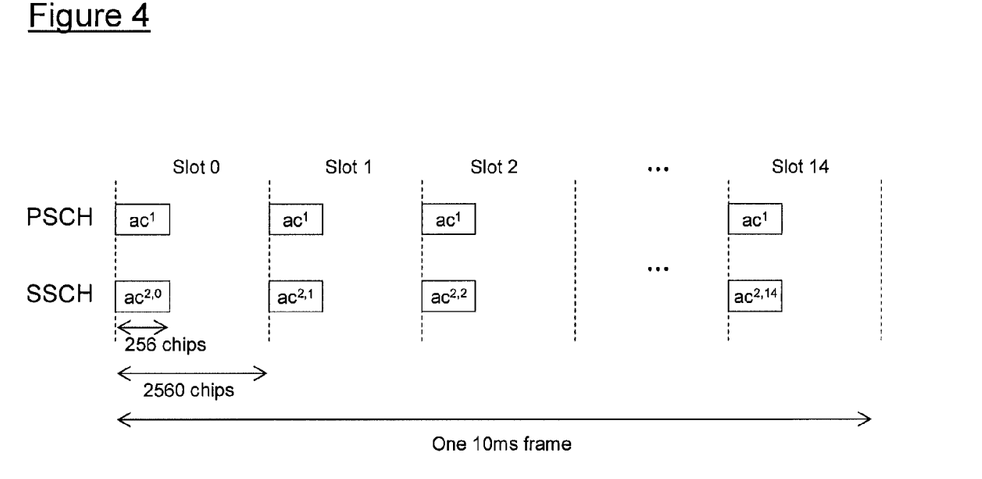
FIG. 4 is a schematic representation of the structure of a synchronization channel (SCH)

As illustrated schematically in FIG. 2, the 3GPP WCDMA synchronization channel SCH in fact comprises two sub channels, the primary synchronization channel PSCH and the secondary synchronization channel SSCH. These are multiplexed with the other channels for transmission from the base station 104. As illustrated in FIG. 3, in a WCDMA system a channel is typically divided into a plurality of frames (typically 10 ms) and each frame is subdivided into a plurality of slots (typically 15). The synchronization channel SCH has such a structure according to the 3GPP standards, each slot being of length 2560 chips. FIG. 4 schematically illustrates the structure of an SCH frame.

The Primary SCH comprises a modulated code of length 256 chips, referred to as the Primary Synchronization Code (PSC) and denoted $c^1$ in FIG. 4. This primary synchronization code (PSC) is transmitted once every slot, in the first 256 chips only. The PSC is the same for every cell 102 in the system.

The Secondary SCH comprises a repeated sequence of 15 modulated Secondary Synchronization Codes (SSC), each code of length 256 chips. These are transmitted in parallel with the Primary SCH. The SSC is denoted $c^{2,m}$ in FIG. 4, where m=0, 1, . . . , 14 is the slot number. Each SSC is chosen from a set of 16 different possible codes each of length 256. This sequence on the Secondary SCH indicates which scrambling code group the cell's downlink scrambling code belongs to. Thus the sequence $c^2$ is characteristic of the cell 102, and is used to indicate the scrambling code for that cell 102.

The primary and secondary synchronization codes transmit a symbol "a" shown in FIG. 4 and discussed in more detail later.

As discussed above, since the synchronization channel SCH is not scrambled by a scrambling code, it can interfere with received downlink signals being transmitted from the base station 104 to UE 106. The following describes an algorithm according to a preferred embodiment of the present invention that improves cancellation of interference from the Synchronization Channels, and also need have little impact on complexity.

First some notation is introduced. The received signal $y_i$ of downlink WCDMA sampled at chip instant i can be modelled as:

$$y_i = h \sum_{k=1}^{K} c_i^k a^k + n_i,$$

where h is the channel gain, $n_i$ is the thermal noise plus inter-cell interference, $c_i^k$ is the spread and scrambled sequence of code k and $a^k$ is the encoded symbol transmitted over code k.

In the notation used herein, code 1 ($c_i^1$) corresponds to the PSCH sequence and code 2 ($c_i^2$) corresponds to the SSCH sequence of the serving Node-B. The remaining channels take the code indices 3 to K, and among these channels is the Common Pilot Channel CPICH (section 5.3.3.1, 3GPP TS 25.211, "Technical Specification Group Radio Access Network; Physical Channels and Mapping of Transport Channels onto Physical Channels (FDD)", December 2005). The main purpose of the CPICH is as a reference channel used for channel estimation by the UE 106. However, embodiments of the present invention take advantage of the presence of this channel to use it for an additional purpose, in order to cancel interference from the synchronization channel SCH on a received downlink signal $y_i$.

All the sequences $c_i^k$, k=1, . . . , K are unit energy. The synchronization channels are transmitted over the first 256 chips of each slot, with transmitted symbol $a^k$ being exactly the same all the time.

For simplicity of notation the powers on different channels are referenced with respect to the power on the CPICH. We denote $\hat{h}$ the channel estimate generated using the CPICH processing.

The symbol transmitted on the synchronization channels has the form:

$$a^k = \lambda \sqrt{\gamma^k} \frac{(1+j)}{\sqrt{2}},$$

where $j=\sqrt{-1}$ is the imaginary unit, and $\lambda=+1$ in case the Primary Common Control Physical Channel (P-CCPCH) is Transmit Diversity Encoded, $\lambda=-1$ in case it is not.

$\gamma^k=|a^k|^2$ represents the power difference of code k (k=1, 2) with respect to the CPICH.

For cancelling the synchronization channels, one can imagine for each slot generating:

$$z^k = \frac{1}{L} \sum_{i=1}^{L} c_i^k y_i, (k=1, 2)$$

where L=256 is the length of the synchronization sequence. $z^k$ corresponds to the estimate of the gain $g^k=h\, a^k$ composite of the channel and the symbol transmitted on channel k ($\hat{g}^k=z^k$).

The preferred embodiments of the present invention exploit the fact that the gain $g^k=h\, a^k$ can be induced from the CPICH channel estimate h once $a^k$ is known. The symbol $a^k$ depends on the configuration of the Node-B (ratio between CPICH and SCH powers, Transmit Diversity encoding) which is static or semi-static and is fixed over the span of several frames at least.

To improve the performance of the cancellation, the accuracy of $\hat{g}^k$ should be improved. This can be achieved by averaging over several slots. This strategy has a limit as the channel is time varying and can be significantly different from a slot to another.

In the gain $g^k=h\, a^k$ only the channel varies from slot to another. The symbol $a^k$ however only depends on the Node-B configuration which is quasi-static. Therefore the estimate of $g^k$ can be made more accurate by taking the channel estimate of the CPICH ($\hat{h}$), and only using the synchronization channel despreading ($z^k$) to estimate $a^k$.

The use of this approach allows a reduction in the complexity, either by estimating $a^k$ once only at the start, or by taking a continuous time approach in which the update rate of $a^k$ is reduced. That is, the same estimate of $a^k$ can be used over several slots of the synchronisation channel for which corresponding interference is cancelled on the received signal, instead of estimating it separately for every slot for which interference will be cancelled.

Figure 5:
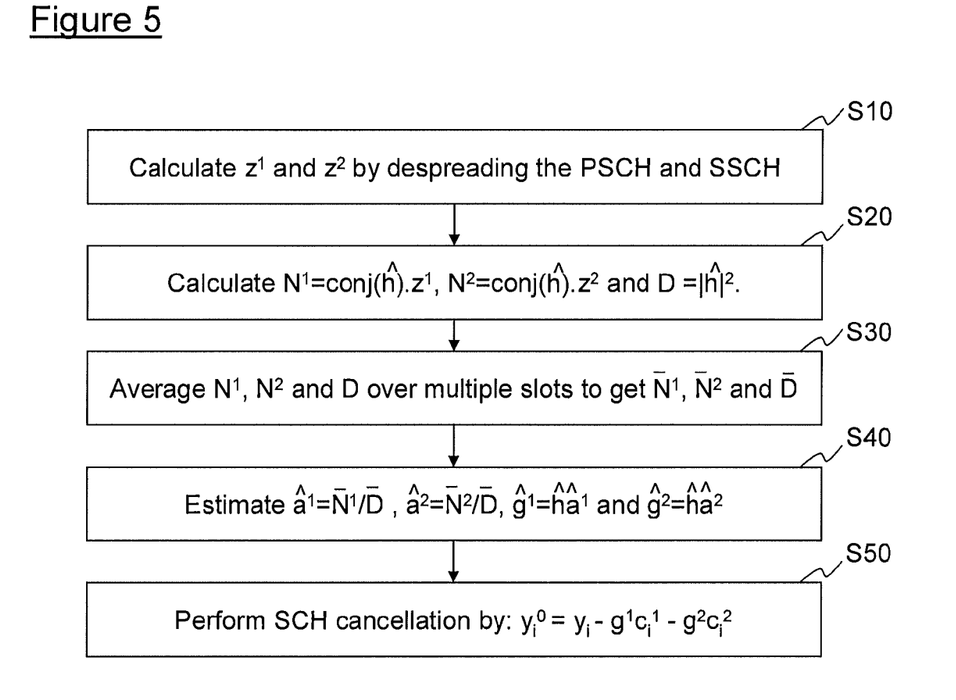
FIG. 5 is a flow chart showing an algorithm for synchronization channel cancellation.

Referring to the flow chart of FIG. 5, the first step S10 of the algorithm is to calculate $z^1$ and $z^2$ by despreading the primary and secondary SCH.

At the second step S20, in order to estimate $a^k$, the correlation between the despread SCH channels and the CPICH as well as the power of the CPICH are calculated:

$N^k = \text{conj}(\hat{h})z^k, k=1,2$ $D=|\hat{h}|^2.$

Clearly $$\frac{N^k}{\overline{D}}$$

is an estimate of $a^k$. However, to improve this estimate, at step S30 preferably each of the numerator and the denominator are averaged over multiple slots in order to obtain $\overline{N}^k$ and $\overline{D}$.

The averaging could for example be done via a simple sum in case the estimate is done once for all or via an Infinite Impulse Response (IIR) filter in case a continuous time approach is preferred. In both cases and to obtain the best performance both the numerator and the denominator should be averaged exactly in the same way.

At step S40 the estimate is therefore calculated as:

$$\hat{a}^k = \frac{\overline{N}^1}{\overline{D}}.$$

and $\hat{g}^1 = \hat{h}\hat{a}^1$, $\hat{g}^2 = \hat{h}\hat{a}^2$.

As an alternative to step S40, the estimate can be improved by exploiting the structure of $a^k$. In fact:

$$a^k = \lambda\sqrt{\gamma^k}\frac{(1+j)}{\sqrt{2}} \text{ and } \frac{(1-j)}{\sqrt{2}}a^k = \lambda\sqrt{\gamma^k}$$

which is strictly real. Therefore, a better estimate at S40 is given by:

$$\hat{a}^k = \frac{(1+j)}{\sqrt{2}}\text{real}\left((1-j)\frac{\overline{N}^k}{\overline{D}}\right),$$

where real(x) is the real part of the complex value x.

At the final step S50, The synchronization channels cancellation is then achieved by subtracting the contribution of each of the primary and secondary channels at the chip level:

$$y_i^o = y_i - \hat{g}^1 c_i^1 - \hat{g}^2 c_i^2,$$

where $y_i^o$ is the signal after subtraction of the synchronization channels.

In the case where complexity is reduced by not calculating $z^1, z^2$ every slot, it is preferable that the slots that are used have balanced frame indices. Balanced frame indices means that the used slots span all the possible positions in the frame, for example using slot 0 of frame 0, slot 1 of frame 1, ..., slot 14 of frame 14, slot 0 of frame 15, slot 1 of frame 16, and so on. The reason is that the scrambling sequence applied to the CPICH (and to all OVSF codes) is repeated every frame, taking the same slot index from each frame for the calculation of $z^1, z^2$ creates a constant interference pattern that cannot be removed by averaging over frames. However, averaging over slot indices (scrambling changes from a slot index to another) allows this interference to be removed.

The preferred embodiments of the present invention provide the following advantages.

Using the preferred embodiments, the invention may allow near perfect Synchronization channel cancellation by improving the estimate of the PSCH and SSCH gain used in the cancellation.

The present invention may also allow complexity to be reduced with respect to existing techniques since PSCH and SSCH despreading is not required for every slot.

The present invention may be applicable in different multiple antenna settings, namely transmit diversity, receive diversity and MIMO mode.

Further, the present invention is flexible and can be applied to different receiver structures: Rake and Equaliser. In the case of the Rake almost all of the performance gain is achieved by applying SCH channels cancellation on the strongest finger only.

For Rake, the algorithm can be applied on each finger of the Rake receiver by applying the cancellation to the received signal and at the right delay corresponding to the processed finger. The channel estimate in this case corresponds to the finger gain estimate from the CPICH processing. $a^k$ is the same for all fingers.

In case Rake is used, applying the Synchronization Channel cancellation on the strongest finger (or the $N_r$ strongest fingers in case $N_r$ receive antennas are used) allows recovery of most of the performance loss due to the presence of the SSCH and PSCH. In the critical case of single ray channel (where the lowest level of interference is more likely to be required) all the performance loss is recovered.

In the case where an Equaliser is used, the algorithm can be applied at the output of the Equaliser. Therefore h can be estimated by processing the CPICH at the output of the Equaliser. For MIMO Equaliser a different h has to be estimated per output stream, the cancellation is performed per stream but $a^k$ is the same for all streams.

When Time Switched Transmit Diversity (TSTD) scheme is applied to the SCH channels, the channel estimate $\hat{h}$ generated from the CPICH processing corresponds to the main antenna (antenna 1) in even slots indices and the diversity antenna (antenna 2) in odd slots indices, thus matching the TSTD pattern.

Figure 6:
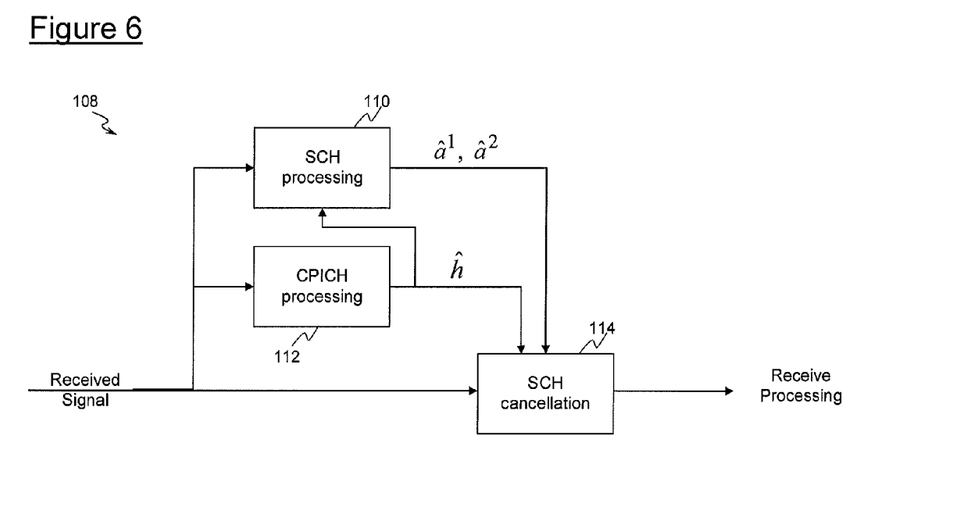
FIG. 6 is a schematic block diagram of a synchronization channel cancellation and receive processing block of a UE.

The present invention may be implemented by means of a SCH cancellation & receive processing block 108 in the UE 106. As shown schematically in FIG. 6, this block 108 may comprise an SCH cancellation block 114, and an SCH processing block 110 and a CPICH block 112 each with an input arranged to receive the downlink signal y and each having an output coupled to the SCH cancellation block 114. The output of the CPICH processing block 112 is coupled to another input of the SCH processing block 110. The CPICH processing block 112 is configured to generate the channel estimate $\hat{h}$ based on the CPICH in the received signal y. The SCH processing block 110 is configured to perform processing according to steps S10 to S30 described above using the received signal y and the channel estimate $\hat{h}$ output by the CPICH processing block 112, and output the symbols $a^k$ (k=1, 2) to the SCH cancellation block 114. The SCH cancellation block 114 is configured to perform processing according to step S50 described above using the channel estimate $\hat{h}$ output by the CPICH processing block 112 and the symbols $a^k$ output by the SCH processing block 110. The SCH cancellation block 114 is thus configured to pass the resulting signal onwards for further receive processing and ultimately for output to an output device such as a speaker.

The blocks 110, 112 and 114 are preferably implemented in the form of software stored on a memory of the UE 106 and executed on a processor of the UE 106. However, the option of some or all of the functionality being implemented in dedicated hardware is not precluded.

Figure 7:
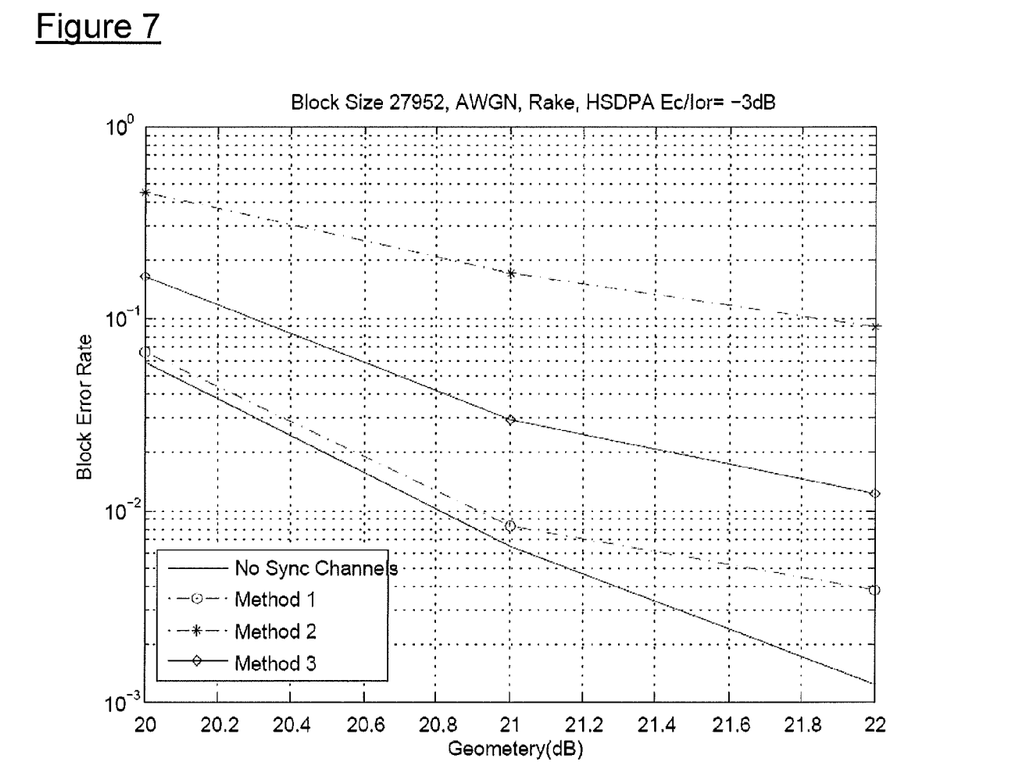
FIG. 7 is a graph showing BLER performance for Highest Category 10 Transport Block Size.
Figure 8:
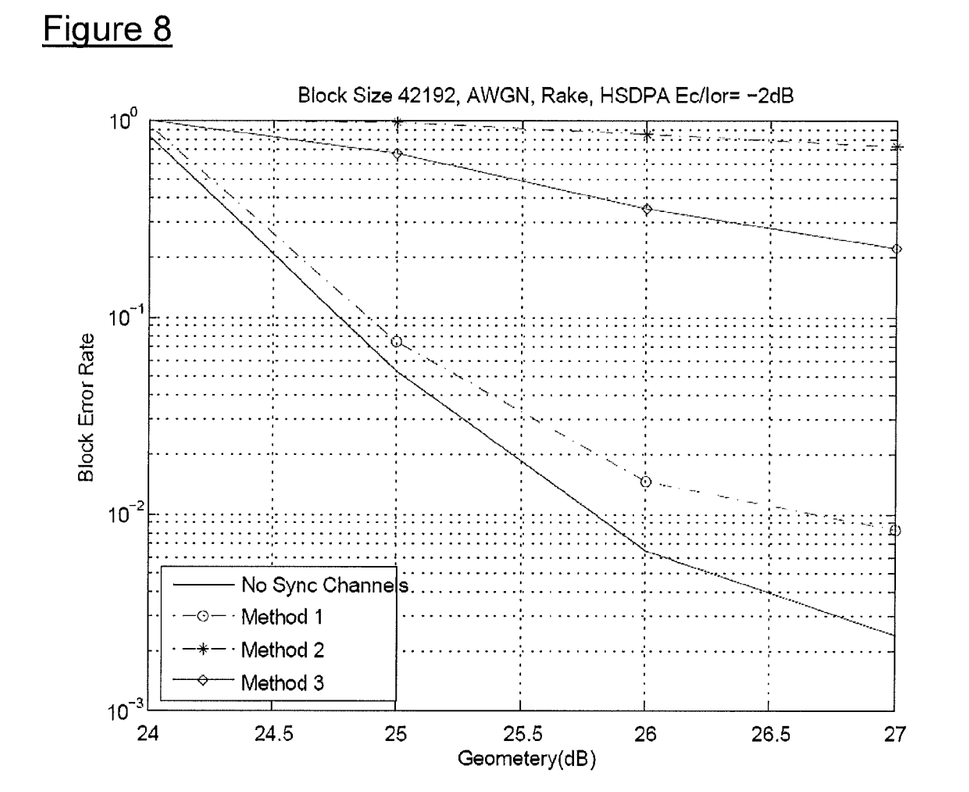
FIG. 8 is a graph showing BLER performance for Highest Category 14 Transport Block Size.

To evaluate the effectiveness of the solution detailed simulations have been carried out. The simulations measure the Block Error Rate (BLER) performance for fixed transport block sizes transmitted on the High Speed Physical Downlink Share Channel (HS-PDSCH). Simulations assume an Additive White Gaussian Noise (AWGN) channel and Rake receiver structure. FIG. 7 shows the performance for the highest transport block size of Category 10 with 16-QAM modulation i.e. transport block size 27952 [3GPP TS 25.321, "Technical Specification Group Radio Access Network; Medium Access Control (MAC) protocol specification", Sep. 2008, Annex A]. FIG. 8 shows the performance for the highest transport block size of Category 14 with 64-QAM modulation i.e. transport block size 42192.

In both figures performance is given in term of BLER versus Geometry. The Geometry is the ratio of the useful received signal power to the noise plus inter-cell interference power. Each of the figures compares the performance of our proposed synchronization channels cancellation method that uses the CPICH channel estimate 'Method 1' to the reference case when no Synchronization Channels are present 'No Sync Channel'. The curve 'Method 2' corresponds to the case when CPICH is not used and the gain is estimated from the SCH channels processing $k^k=z^k$. 'Method 3' is when an additional averaging over 2 slots is applied to the gain estimated from the SCH channels processing as in Method 2.

In the two simulated cases the proposed use of the CPICH outperforms the cases when the cancellation relies on the SCH channels processing only. In FIG. 7 and for BLER around the 10% point the proposed method gets within 0.05 dB of the reference 'No Sync Channel' performance. The non-use of the CPICH leads in the best case to 0.4 dB loss with respect to the reference case. In FIG. 8 the difference is even more dramatic; the proposed method leads to around 0.1 dB loss only when the non-use of the CPICH leads to more than 3 dB degradation.

It will be appreciated that the above embodiments are described only by way of example. The invention is not limited to any particular WCDMA or 3GPP standard or otherwise. The principle of the invention based on using the pilot signal for cancellation can be extended, given the disclosure herein, to any wireless cellular communication system in which a synchronization channel causes interference on a signal. For example, preferably the invention exploits the fact that the gain can be induced from the channel estimate determined from the pilot channel, which is an idea that can be applied to any such system, not just 3GPP or WCDMA systems. Other configurations and applications of the present invention may be apparent to the person skilled in the art given the disclosure herein. The scope of the invention is not limited by the described embodiments, but only by the appended claims.

The invention claimed is:

1. A method of wireless communication in a cellular communication system comprising a plurality of base stations, the method comprising:
   synchronizing to one of the base stations using a synchronization channel transmitted from that base station;
   receiving a pilot channel from said base station;
   after synchronizing to said base station, receiving a signal from that base station; and
   using the pilot channel from said base station to cancel interference on said signal caused by the synchronization channel, wherein said cancellation comprises;
      performing a channel estimate based on the pilot channel;
      estimating a symbol received in the synchronization channel;
      using the estimated symbol and channel estimate to estimate a gain of the synchronization channel; and
      using the gain to cancel interference on said signal caused by the synchronization channel, wherein a same estimate of said symbol is used over a plurality of slots of the synchronization channel for which corresponding interference is cancelled on said signal.

2. The method of claim 1, wherein the communication system is a code division multiple access communication system, each base station operating according to a different respective scrambling code different from that of a plurality of others of said base stations;
   the synchronization channel is not scrambled by one of said scrambling codes and thus causes interference on said signal; and
   said cancellation comprises using the pilot channel from said base station to cancel interference on said signal caused by non-orthogonality of the synchronization channel.

3. The method according to claim 1, wherein the estimation of said symbol is by: despreading the synchronization channel, estimating a correlation between the despread synchronization channel and the pilot channel, estimating a power of the pilot channel, and estimating said symbol based on said correlation and pilot channel power.

4. The method of claim 3, wherein at least one of said estimates of correlation and pilot channel power is averaged over a plurality of slots.

5. The method according to claim 1, wherein said symbol is estimated using predetermined knowledge of a structure of the symbol.

6. The method of claim 1, wherein the pilot channel is a common pilot channel.

7. The method of claim 6, wherein the communication system is a WCDMA system, and the common pilot channel is a CPICH.

8. The method of claim 1, wherein:
   said synchronization comprises synchronizing to said base station using a plurality of synchronization channels; and
   said cancellation comprises using the pilot channel from said base station to cancel interference on said signal caused by the plurality of synchronization channels.

9. The method of claim 8, wherein:
   said synchronization comprises synchronizing to said base station using a primary and secondary synchronization channel; and
   said cancellation comprises using the pilot channel from said base station to cancel interference on said signal caused by the primary and secondary synchronization channels.

10. The method of claim 9, wherein the communication system is a WCDMA system and said primary and secondary synchronization channels are a PSCH and SSCH respectively.

11. A computer program product for wireless communication in a cellular communication system comprising a plurality of base stations, the computer program product comprising a non-transitory computer usable medium having a computer-readable program code embodied therein being configured so as when executed to perform a method of wireless communication in a cellular communication system comprising a plurality of base stations, the method comprising:
   synchronizing to one of the base stations using a synchronization channel transmitted from that base station;
   receiving a pilot channel from said base station;
   after synchronizing to said base station, receiving a signal from that base station; and using the pilot channel from said base station to cancel interference on said signal caused by the synchronization channel, wherein said cancellation comprises;
performing a channel estimate based on the pilot channel;
estimating a symbol received in the synchronization channel;
using the estimated symbol and channel estimate to estimate a gain of the synchronization channel; and
using the gain to cancel interference on said signal caused by the synchronization channel, wherein a same estimate of said symbol is used over a plurality of slots of the synchronization channel for which corresponding interference is cancelled on said signal.

12. A user equipment for wireless communication in a cellular communication system comprising a plurality of base stations, the user equipment comprising:
a receiver arranged to receive a synchronisation channel and a pilot channel transmitted from one of said base stations;
a processing unit, coupled to the receiver, arranged to synchronize to said base station using the synchronization channel;
wherein the receiver is configured to receive a signal from said base station after synchronization to that base station; and
wherein the processing unit is configured to:
use the pilot channel from said base station to cancel interference on said signal caused by the synchronization channel,
use a same estimate of said symbol over a plurality of slots of the synchronization channel for which corresponding interference is cancelled on said signal; and
perform said cancellation by:
performing a channel estimate based on the pilot channel;
estimating a symbol received in the synchronization channel;
using the estimated symbol and channel estimate to estimate a gain of the synchronization channel; and
using the gain to cancel said interference on said signal caused by the synchronization channel.

13. The user equipment of claim 12, wherein the user equipment is for wireless communication in a code division multiple access communication system, each base station operating according to a different respective scrambling code different from that of a plurality of others of said base stations;
the synchronization channel is not scrambled by one of said scrambling codes and thus causes interference on said signal; and
the processing unit is configured to perform said cancellation using the pilot channel from said base station to cancel interference on said signal caused by nonorthogonality of the synchronization channel.

14. The user equipment of claim 12, wherein the processing unit is configured to perform the estimation of said symbol by: despreading the synchronization channel, estimating a correlation between the despread synchronization channel and the pilot channel, estimating a power of the pilot channel, and estimating said symbol based on said correlation and pilot channel power.

15. The user equipment of claim 14, wherein the processing unit is configured to average at least one of said estimates of correlation and pilot channel power over a plurality of slots before estimation of said symbol.

16. The user equipment of claim 12, wherein the processing unit is configured to estimate said symbol using predetermined knowledge of a structure of the symbol.

17. The user equipment of claim 12, wherein the received pilot channel is a common pilot channel.

18. The user equipment of claim 17, wherein the user equipment is for wireless communication in a WCDMA system, and the common pilot channel is a CPICH.

19. The user equipment of claim 12, wherein: the processing unit is configured to synchronize to said base station using a plurality of synchronization channels, to perform said cancellation by using the pilot channel from said base station to cancel interference on said signal caused by the plurality of synchronization channels.

20. The user equipment of claim 19, wherein: the processing unit is configured to synchronize to said base station using a primary and secondary synchronization channel, and to perform said cancellation using the pilot channel from said base station to cancel interference on said signal caused by the primary and secondary synchronization channels.

21. The user equipment of claim 20, wherein the user equipment is for wireless communication in a WCDMA system and said primary and secondary synchronization channels are a PSCH and SSCH respectively.

* * * * *